US006823833B2

(12) United States Patent
Ismailov

(10) Patent No.: US 6,823,833 B2
(45) Date of Patent: *Nov. 30, 2004

(54) SWIRL INJECTOR FOR INTERNAL COMBUSTION ENGINE

(75) Inventor: Murad M. Ismailov, Fernandina Beach, FL (US)

(73) Assignee: Combustion Dymanics Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/351,787

(22) Filed: Jan. 27, 2003

(65) Prior Publication Data

US 2003/0132323 A1 Jul. 17, 2003

Related U.S. Application Data

(63) Continuation of application No. 09/854,621, filed on May 15, 2001, now Pat. No. 6,510,836, which is a continuation-in-part of application No. 09/614,381, filed on Jul. 3, 2000, now abandoned.

(51) Int. Cl.[7] .......................... F02M 61/18; G01F 1/00; G01P 3/36
(52) U.S. Cl. ................. 123/299; 123/494; 239/533.12; 239/585.1; 356/28.5
(58) Field of Search .................................. 123/299, 300, 123/305, 494; 239/463, 464, 533.2, 533.12, 585.1, 585.4, 585.5; 356/28, 28.5; 73/861

(56) References Cited

U.S. PATENT DOCUMENTS

| 3,937,087 A | * | 2/1976 | Heggie | 73/726 |
| 4,073,186 A | * | 2/1978 | Erwin, Jr. | 73/114 |
| 4,192,179 A | * | 3/1980 | Yelke | 73/119 A |

(List continued on next page.)

FOREIGN PATENT DOCUMENTS

| JP | 1-227865 | * | 9/1989 |
| JP | 3-033422 | * | 2/1991 |
| JP | 8-121288 | * | 5/1996 |
| JP | 8-121289 | * | 5/1996 |
| JP | 10-311264 | * | 11/1998 |
| JP | 11-082229 | * | 3/1999 |

OTHER PUBLICATIONS

Harada et al., "Development of Direct Injection Gasoline Engine", SAE Technical Paper 970540, Feb. 24–27, 1997.*

Iwamoto et al., "Development of Gasoline Direct Injection Engine", SAE Technical Paper 970541, Feb. 24–27, 1997.*

Ismailov et al., "LDA/PDA measurements of instantaneous characteristics in high pressure fuel injection and swirl spray", Experiments in Fluids, vol. 27, pp. 1–11 (1999).*

Norman et al., Diesel Technology, The Goodheart–Willcox Company, Inc., Illinois (2001), pp. 510–512.*

Primary Examiner—Tony M. Argenbright
(74) Attorney, Agent, or Firm—Greenberg Traurig LLP

(57) ABSTRACT

The swirl injector for an internal combustion engine is an electronic fuel injector for a direct injection engine, either gasoline or diesel. The injector has a housing defining a fluid channel, a needle valve disposed in the fluid channel with a spring biasing the valve to a closed position, and a solenoid disposed in the housing encircling the fluid channel. The injector has a nozzle with a conical valve seat and a cylindrical discharge orifice. The needle tip is ball shaped, and the needle body has a plurality of helical grooves which are rectangular in cross section having a width to depth ratio of 1.5:1 at about a 46° angle adjacent the tip. The valve lift is 50 μm in 60 μs. The penetration, swirl speed, and pitch angle are controllable through the injection pressure, providing an enhanced fuel injector for dual mode fuel injection.

29 Claims, 8 Drawing Sheets

U.S. PATENT DOCUMENTS

| | | | | |
|---|---|---|---|---|
| 4,192,466 A | * | 3/1980 | Tanasawa et al. | 239/464 |
| 4,230,273 A | * | 10/1980 | Claxton et al. | 239/125 |
| 4,365,746 A | * | 12/1982 | Tanasawa et al. | 239/125 |
| 4,629,127 A | * | 12/1986 | Kawamura et al. | 239/489 |
| 4,650,121 A | * | 3/1987 | Augustin | 239/464 |
| 4,653,694 A | * | 3/1987 | Noguchi et al. | 239/533.12 |
| 4,721,253 A | * | 1/1988 | Noguchi et al. | 239/464 |
| 4,974,565 A | * | 12/1990 | Hashimoto et al. | 123/299 |
| 5,020,728 A | * | 6/1991 | Linder et al. | 239/533.12 |
| 5,058,549 A | * | 10/1991 | Hashimoto et al. | 123/298 |
| 5,163,621 A | * | 11/1992 | Kato et al. | 239/533.12 |
| RE34,527 E | * | 2/1994 | Yoshida et al. | 239/96 |
| RE34,591 E | * | 4/1994 | Yoshida et al. | 239/96 |
| 5,533,482 A | * | 7/1996 | Naitoh | 123/305 |
| 5,785,257 A | * | 7/1998 | Furuya et al. | 239/585.4 |
| 5,983,854 A | * | 11/1999 | Machida et al. | 123/295 |
| 6,128,072 A | * | 10/2000 | Kiel et al. | 356/28 |
| 6,510,836 B2 | * | 1/2003 | Ismailov | 123/299 |

* cited by examiner

SWIRL INJECTOR FOR INTERNAL COMBUSTION ENGINE

CROSS-REFERENCE TO RELATED APPLICATIONS

This is a continuation application of U.S. Ser. No. 09/854,621, filed May 15, 2001, now Pat. No. 6,510,836, which is a continuation-in-part of Ser. No. 09/614,381, filed Jul. 3, 2000, now abandoned.

BACKGROUND OF THE INVENTION

1. Field of the Invention

The present invention relates to a swirl injector for an internal combustion engine, and particularly to a fuel injector for a direct injection engine, which may be either a spark injection gasoline engine or a compression ignition diesel engine, which imparts a swirling motion to the fuel during injection to improve injection characteristics and performance The swirl injector has novel characteristics which enable adjustment of the injector's spray pattern to the phase of the stroke cycle, and may be used with a novel on-board flow meter which provides feedback to the engine control unit for adjusting injection characteristics.

2. Description of the Related Art

In recent years there has been a renewed interest in direct injection gasoline engines due to the greater fuel economy that can be achieved with direct injection engines, both for the sake of the savings in fuel costs and for the reduction in greenhouse gases consequent on reduced hydrocarbon fuel usage. The majority of gasoline fuel injection engines still use either throttle body injection or port injection into the intake manifold. Efforts towards using direct injection in gasoline engines have been complicated by the difficulty in finding a fuel injector which is capable of producing a homogenous air-fuel mixture during early fuel injection for a full load and a stratified air-fuel mixture during late fuel injection for a partial load, by controlling a stratified air-fuel mixture over a wide range of operating loads, and by the need for a rapid and smooth switching system for switching between early and late fuel injection. See SAE Technical Paper 970540, "Development of Direct Injection Gasoline Engine", Harada et al., February, 1997, and SAE Technical Paper 970541, "Development of Gasoline Direct Injection Engine", Iwamoto et al., February, 1997.

On the other hand, diesel engines may use direct injection into the combustion chamber, injection into a precombustion chamber connected to the main combustion chamber, or injection into a swirl chamber connected to the main combustion chamber. Direct injection is used with most heavy duty, high-speed diesel engines due to its greater fuel economy. A precombustion chamber is used with most passenger vehicles because of the smoother combustion and lower noise level available, at the cost of decreased fuel economy. A swirl chamber increases fuel economy over a precombustion chamber, but requires more precise machining, engineering, and matching of components. Fuel injectors for diesel engines were largely mechanically actuated and controlled until the 1980's. With the advent of concerns about emission controls and the development of automotive electronics, diesel engines now use electronic control modules or units to control the metering and timing of fuel delivery, although actuation of the injector plunger may still be done mechanically to develop the high injection pressures needed. A representative example is the fuel injector used in the Detroit Diesel Series 60 engine, described in *Diesel Technology*, Norman et al., pp. 510–512 (Goodhart-Willcox Company, Inc., 2001), in which a cam activated rocker arm depresses the injector plunger, raising the fuel pressure to unseat the needle valve, while fuel metering is controlled by a solenoid activated poppet valve. Smaller direct injection diesel engines may rely entirely on air swirl for mixing air and fuel in the combustion chamber, although some mechanical injectors for diesel engines provide for swirling the fuel as it leaves the injector.

Various solutions have been proposed to address these problems. U.S. Pat. No. Re. 34,527, issued Feb. 1, 1994 to Yoshida et al. describes a fuel injector having helical grooves. The patent is particularly directed to the feeder wire structure for the electromagnetic structure. U.S. Pat. No. Re. 34,591, issued Apr. 26, 1994 to Yoshida et al., shows the same injector as the '527 patent, but is directed to the submagnetic structure which controls the amount of lift.

U.S. Pat. No. 4,192,466, issued Mar. 11, 1980 to Tanasawa et al., shows a swirl injector for a diesel engine having a swirl chamber. U.S. Pat. No. 4,230,273, issued Oct. 28, 1980 to Claxton et al., describes an injector switchable between single point and multi-point injection systems. The embodiment shown in FIG. 9 has helical grooves, but appears to be a pintle type not designed for dual injection. U.S. Pat. No. 4,365,746, issued Dec. 28, 1982 to Tanasawa et al. teaches a swirl injector having helical grooves which only extend through a radial angle of 60–100° around the needle body.

U.S. Pat. No. 4,629,127, issued Dec. 16, 1986 to Kawamura et al., teaches a fuel injector having grooves in the needle and adjusting the spray angle by adjusting the area of the gap between the valve needle and valve wall, the area of the grooves, and the angle of the grooves. U.S. Pat. No. 4,653,694, issued Mar. 31, 1987 to Noguchi et al., discloses a fuel injector in which the spray angle is adjusted by tapering the walls of the valve body and the needle, and by adjusting the lift height to vary with the load.

U.S. Pat. No. 4,721,253, issued Jan. 26, 1988 to Noguchi et al., describes a swirl injector which uses a straight passage between the needle and the valve body combined with a tangential groove to provide a spray with both angle and straight components. U.S. Pat. Nos. 4,974,565 and 5,058,549, issued Dec. 4, 1990 and Oct. 22, 1991, respectively, to Hashimoto et al., teaches a fuel injector with either tangential grooves or projections to impart swirl to the fuel spray, but uses two orifices in the nozzle to provide both wide and narrow spray angles.

U.S. Pat. No. 5,163,621, issued Nov. 17, 1992 to Kato et al., shows a fuel injector with multiple orifices in the nozzle arranged at different angles, and a needle valve tip having conical sections of different diameters, the injection angle and velocity being adjusted by varying the amount of lift. U.S. Pat. No. 5,163,621, issued Jul. 28, 1998 to Furuya et al., describes a swirl fuel injector having a conical needle tip with different diameter conical sections to adjust the spray angle by the gap between the tip and the valve seat.

U.S. Pat. No. 5,983,854, issued Nov. 16, 1999 to Machida et al., teaches a switching scheme for switching between uniform fuel mixture combustion injection on the intake stroke and stratified combustion on the compression stroke by a CPU and gate circuits which test what the load condition is. Japanese Patent No. 1,227,865, published Sep. 12, 1989 shows a fuel injector with a pilot nozzle and a main nozzle having multiple orifices, and a controller which times injections to overlap sprays from the pilot and main nozzles. Japanese Patent No. 3,033,422, published Feb. 13, 1991, teaches stratified combustion obtained by positioning of the spark plug relative to the spray pattern.

Japanese Patent No. 10,311,264, published Nov. 24, 1998; discloses an injector with helical grooves in the needle and a cylindrical element between the helical grooves and the conical tip which is termed a fuel regulator. Japanese Patent No. 11,082,229, published Mar. 26, 1999, shows a fuel injector similar to the Japanese '264 patent, but with a countersunk groove in the base of, the injector body to collect any fuel spit-back after injection.

Applicant is aware of a fuel injector designed by Applicant for Unisia Jecs Co. in 1997–98 and installed in Nissan Motor Company 2.2L engines beginning with April, 1998 with some common structural similarities to the fuel injector of the present invention. The basic construction and operational differences between the injector developed for Unisia Jecs and the fuel injector of the present invention are as follows:

1. The contact zone between the needle and the valve seat has been redesigned. The new design and sizing of the needle ball head, conical nozzle and outlet cylindrical part of the nozzle suppresses shock vibrations of the needle after valve closing to prevent post injection of fuel into the cylinder head and to remove particulate emissions observed in the Unisia Jecs injector.

2. The needle swirling channels have been redesigned. The angle of the channels has been changed from 37° to 46°. The Unisia Jecs injector has concave channels. The present fuel injector has a rectangular profile or cross-section, with the ratio of width-to-depth of 1.5. These changes permit a 2.3 increase of swirling (rotational: speed and simultaneously damped pulsation at 50% of the umbrella part of the spray structure, resulting in higher spray quality, i.e., the time needed to get a micro-spray is decreased to 350 $\mu$s from 800 $\mu$s.

3. In the Unisia Jecs injector the lifting gap was 70 $\mu$m and the response time was limited by the solenoid capacity to 120 $\mu$s. In the present fuel injector the lifting gap is 50 $\mu$m and the response time is 60 $\mu$s, resulting in a higher jet penetration speed and the swirling speed of the umbrella fraction of the spray.

4. In the Unisia Jecs injector, two voltage levels (−7/+12V and −5/+24V) were used to operate the injector in dual switch mode with partial and full load, respectively. With the present fuel injector, the solenoid wiring has been redesigned to provide a continuous change of the lifting force at the same voltage input of 24 or 42 volts directly from the engine power supply. The current supplied to the solenoid controls the continuous operation of the fuel load.

Some of the properties of the Unisia Jecs injector were measured and described by the Applicant in Ismailov et al., "LDA/PDA measurements of instantaneous characteristics in high pressure fuel injection and swirl spray", *Experiments in Fluids*, Vol. 27, pp. 1–11 (1999).

Transducers or sensors permanently mounted on engines for measuring injection characteristics have generally been limited to electromagnetic devices which measure pressure or volume, rather than optical devices, such as those described in U.S. Pat. No. 3,937,087, issued Feb. 10, 1976 to W. S. Heggie (coil wrapped around fuel pipeline which presents variable resistance for sensing tube expansion); U.S. Pat. No. 4,073,186, issued Feb. 14, 1978 to C. L. Erwin, Jr. (electromagnetic sensor); and U.S. Pat. No. 4,192,179, issued Mar. 11, 1980 to E. Yelke (piezoelectric sensor).

Optical devices for measuring fuel flow in injection systems are shown in two Japanese patents. Japanese Patent No. 8-121,288, published May 14, 1996, shows a device for measuring injection rate with a pressure sensor for measuring the force of injection and a laser Doppler anemometer for measuring velocity, and which uses a mathematical formula which relates force and velocity to flow rate. Japanese Patent No. 8-121,289, published May 14, 1996, describes a device which uses two laser Doppler anemometers, one in the main supply line, the other in a bias flow generating unit fed by a divider pipe, to measure the flow rate by a differential flow rate method. Neither of these devices show an on-board sensor with a laser diode source and PIN diode detector.

None of the above inventions and patents, taken either singularly or in combination, is seen to describe the instant invention as claimed. Thus a swirl injector for an internal combustion engine solving the aforementioned problems is desired.

SUMMARY OF THE INVENTION

The swirl injector for an internal combustion engine is an electronic fuel injector for a direct injection engine, either gasoline or diesel. The injector has a housing defining a fluid channel, a needle valve disposed in the fluid channel with a spring biasing the valve to a closed position, and a solenoid disposed in the housing encircling the fluid channel. The injector has a nozzle with a conical valve seat and a cylindrical discharge orifice. The needle tip is ball shaped, and the needle body has a plurality of helical grooves which are rectangular in cross section having a width to depth ratio of 1.5:1 at about a 46° angle adjacent the tip. The valve lift is 50 $\mu$m in 60 $\mu$s. The penetration, swirl speed, and pitch angle are controllable through the injection pressure, providing an enhanced fuel injector for dual mode fuel injection.

In particular, by applying a lower injection pressure (about 5.0 MPa for gasoline engines and 60.0 MPa for diesel engines), the injector provides a pitch angle (measured from the injector's longitudinal axis to the axis of the fuel's core jet) close to 3°, with lower penetration and swirl speeds, which provides lean fuel consumption for late injection (during the compression stroke) for a partial load, such as constant speed cruising. On the other hand, by applying a higher injection pressure (about 7.0 MPa for gasoline engines and 90.0 MPa for diesel engines), the injector provides a pitch angle close to 15°, with higher penetration and swirl speeds, which serves to concentrate the core jet on a controllable point of the piston's surface in an ultra-short time span less than 100 $\mu$s for more power for early injection (during the intake stroke) for a full load, such as acceleration from a stop or climbing a hill.

The performance and rapid response capabilities of the injector may be improved, particularly with diesel engines, by using the swirl injector in combination with a flow meter capable of measuring instantaneous volumetric flow rates or pressure gradients in the fuel pipeline.

Accordingly, it is a principal object of the invention to provide a swirl injector which provides electronic fuel injection for use in either a direct injection spark ignition (gasoline engine), or a direct injection compression ignition (diesel) engine.

It is another object of the invention to provide a swirl injector with controllable pitch angle, penetration speed, and swirl speed for use as a dual mode fuel injector capable of early injection (during the intake stroke) when under full load and late injection (during the compression stroke) when under partial load.

It is a further object of the invention to provide a swirl injector having a needle valve with a ball tip and helical grooves on the needle body adjacent the needle tip having an angle and cross sectional area adjusted to provide a fuel spray having a core jet and spray umbrella of appropriate velocity and penetration for early or late fuel injection, depending on the triggering characteristics.

Still another object of the invention is to provide a swirl injector having the needle valve lift distance and speed optimized to provide ultra-short injection speed.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a swirl injector for an internal combustion engine. More particularly, the swirl injector is an electronic fuel injector for a direct injection engine, which may be either a spark ignition (SI) gasoline engine, or a compression ignition (CI) diesel engine. The swirl injector is designed for use in a dual mode fuel injection system, in which injection may occur during the intake stroke (early injection) while the engine is operating under full load, such as during acceleration from a full stop or climbing a hill, or during the compression stroke (late injection) while the engine is operating under a partial load, such as cruising at constant speed.

Figure 1:
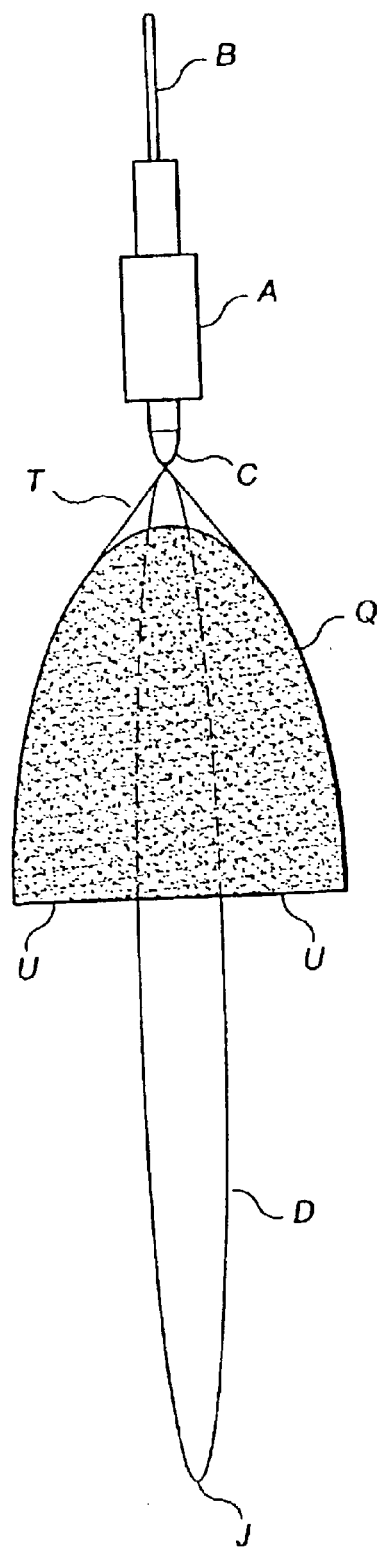
FIG. 1 is a diagram showing a typical spray pattern from a swirl injector.
Figure 2:
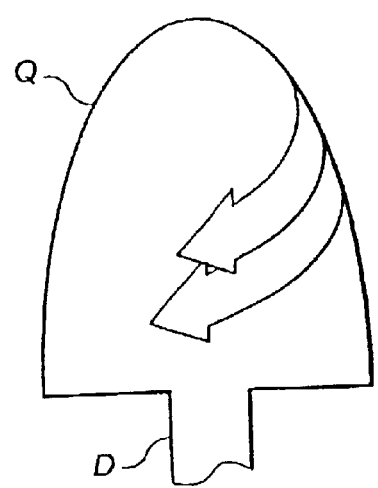
FIG. 2 is a fragmented diagram showing a three dimensional swirl pattern having vertical and horizontal components.

The spray pattern produced by a swirl injector is shown in FIG. 1. A swirl injector A is supplied by a high pressure fuel line B and emits a spray through a nozzle C. The spray includes a core jet D of droplets concentrated in a narrow diameter jet defining an axial penetration front J and a quasi-umbrella shaped fan Q of more widely dispersed droplets defining a radial penetration front U. A transition zone T proximate the nozzle C marks an area where atomized droplets disperse from the core jet D into the quasi-umbrella shaped fan Q. As shown by the arrows in FIG. 2, the quasi-umbrella shaped fan Q describes a three-dimensional swirling pattern resulting from a vertical velocity component urging the spray in an axial direction and a horizontal component urging the spray in a radial direction.

Figure 3A:
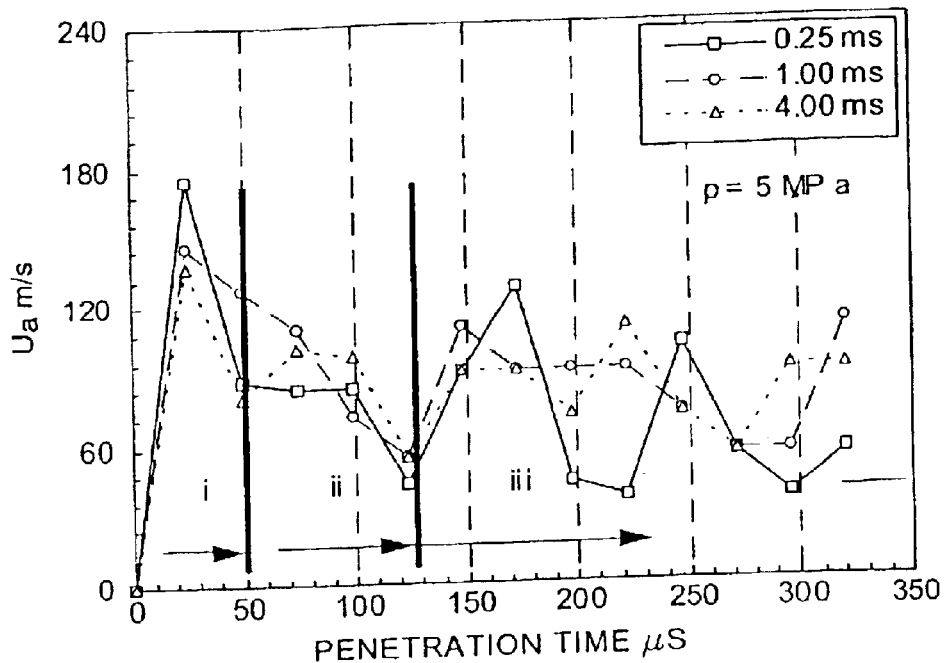
FIGS. 3A and 3B are prior art charts showing the axial spray velocity as a function of time for direct injection gasoline engines at low and high injection pressures, respectively.
Figure 3B:
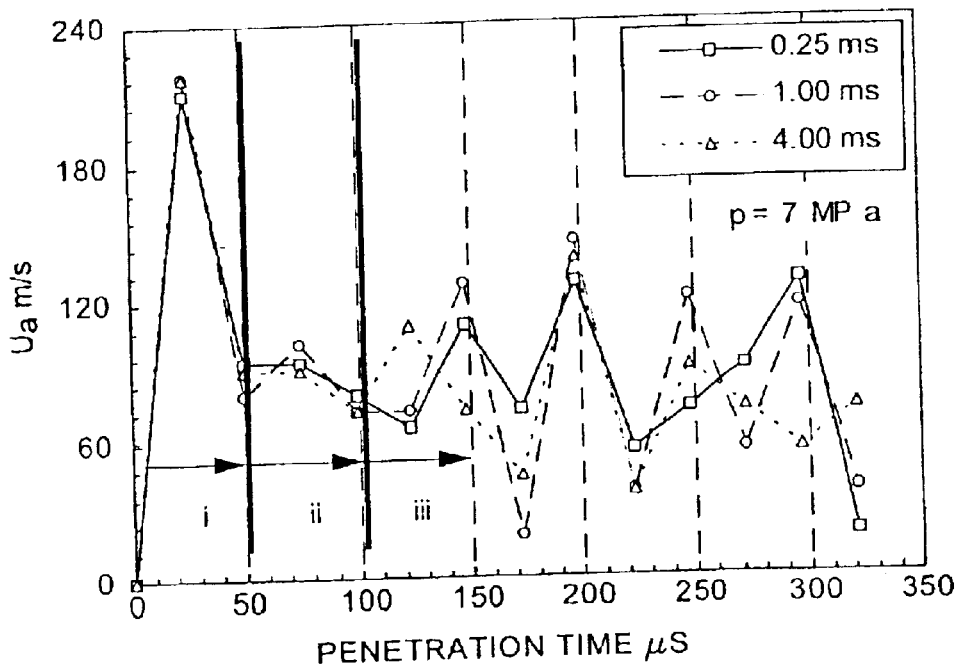
Figure 3C:
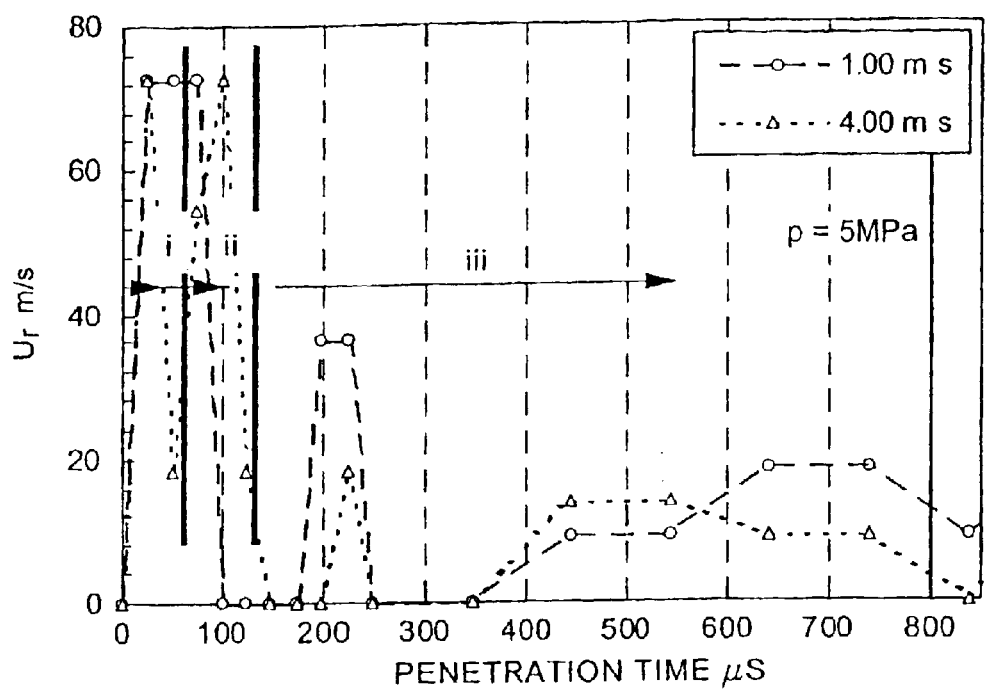
FIGS. 3C and 3D are prior art charts showing the radial spray velocity as a function of time for direct injection gasoline engines with a swirl injector at low and high injection pressures, respectively.
Figure 3D:
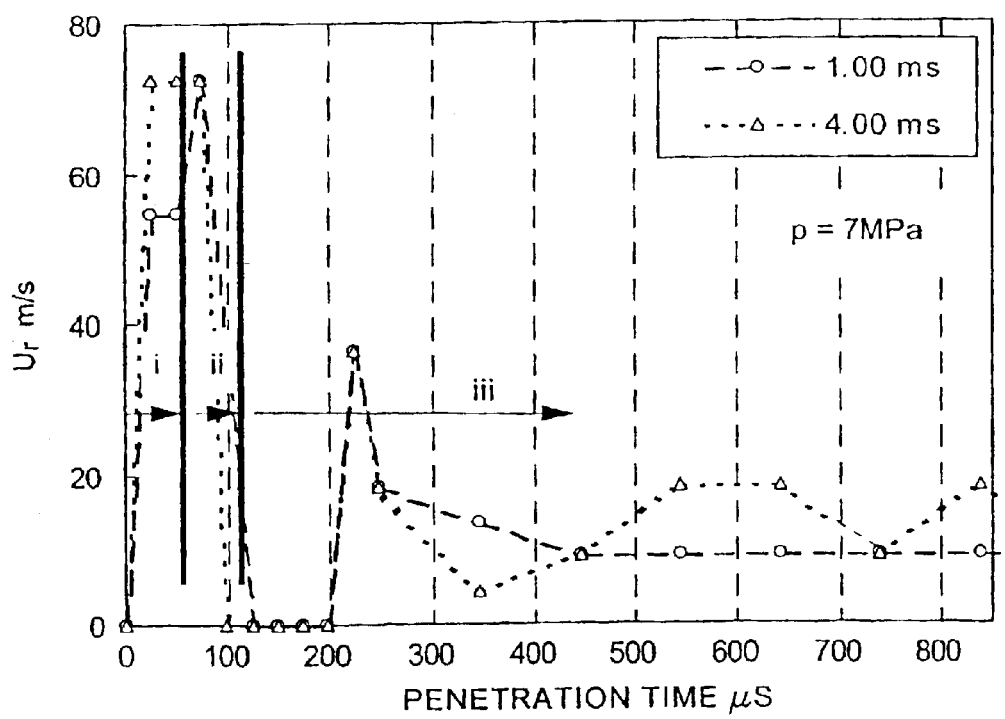

FIGS. 3A and 3B show test data for a Unisia Jecs Co. swirl injector, charting the axial velocity, $U_a$ versus the penetration time for injector pulse widths of 0.25 ms, 1.00 ms, and 4.00 ms at injection pressures of 5 MPa and 7 MPa, respectively. FIGS. 3C and 3D show the radial velocity, $U_r$, versus penetration time for injector pulse widths of 1.00 ms and 4.00 ms at injection pressures of 5 MPa and 7 MPa, respectively. In the charts, the zones (i), (ii) and (iii) correspond to periods of fluid jet propagation, transformation of the jet into droplet spray, and swirling spray motion, respectively.

Figure 4A:
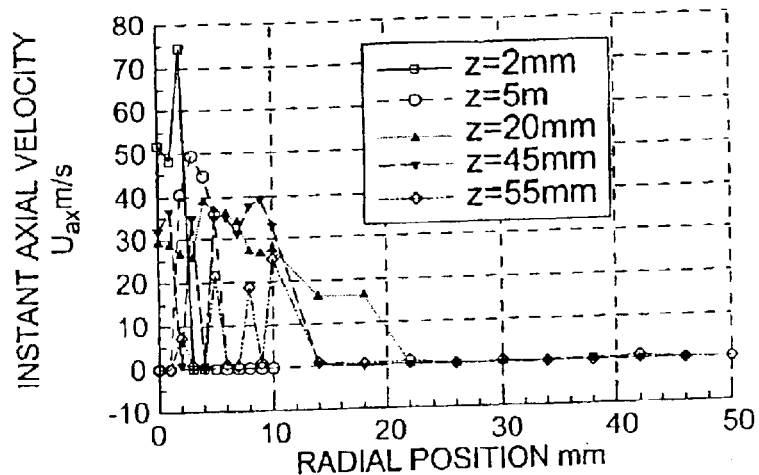
FIGS. 4A, 4B and 4C are prior art charts showing the instantaneous axial velocity, mean Sauter diameter, and droplet concentration, respectively, in a swirl injector spray versus radial position at different axial cross sections at a 90° injection phase.
Figure 4B:
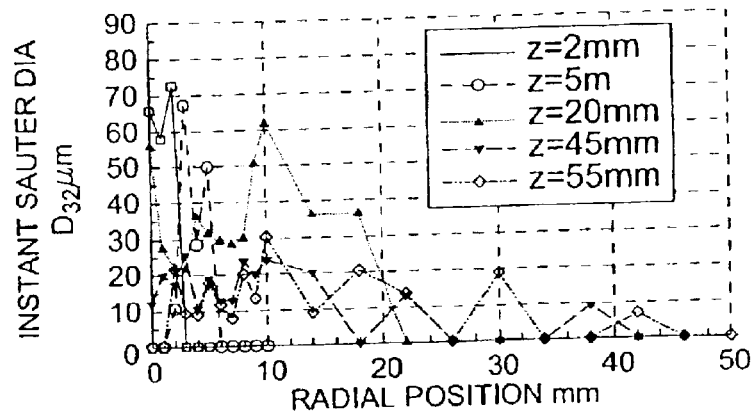
Figure 4C:
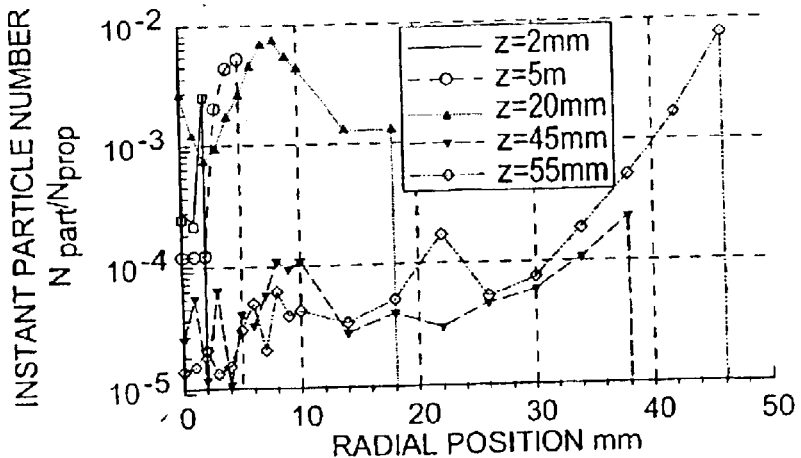

FIGS. 4A, 4B and 4C show the instantaneous axial velocity, $U_{ax}$, mean Sauter diameter, $D_{32}$, and the normalized particle number, $N_{part}/N_{part}$, versus radial position through spray cross-sections at five different axial distances from the nozzle for the same Unisia Jecs swirl injector.

As shown by the data in the above Figures, it is possible to control the spray penetration speed and spatial dynamic distribution in terms of timing and cylinder space, and to obtain a very high quality of the fuel spray, as shown by the Sauter mean diameter, within an ultra-short, controllable injection span of 0.25 to 8.0 ms. The swirl injector of the present invention is designed to avoid certain problems associated with the Unisia Jecs swirl injector, including: particulate emission from post-injection fuel in the cylinder head; improved swirl velocity from redesign of the nozzle for more rapid micro-spray formation; improved lift gap and speed for higher jet penetration and swirling speed; and improved solenoid control voltage for continuous operation of the fuel load.

Figure 5:
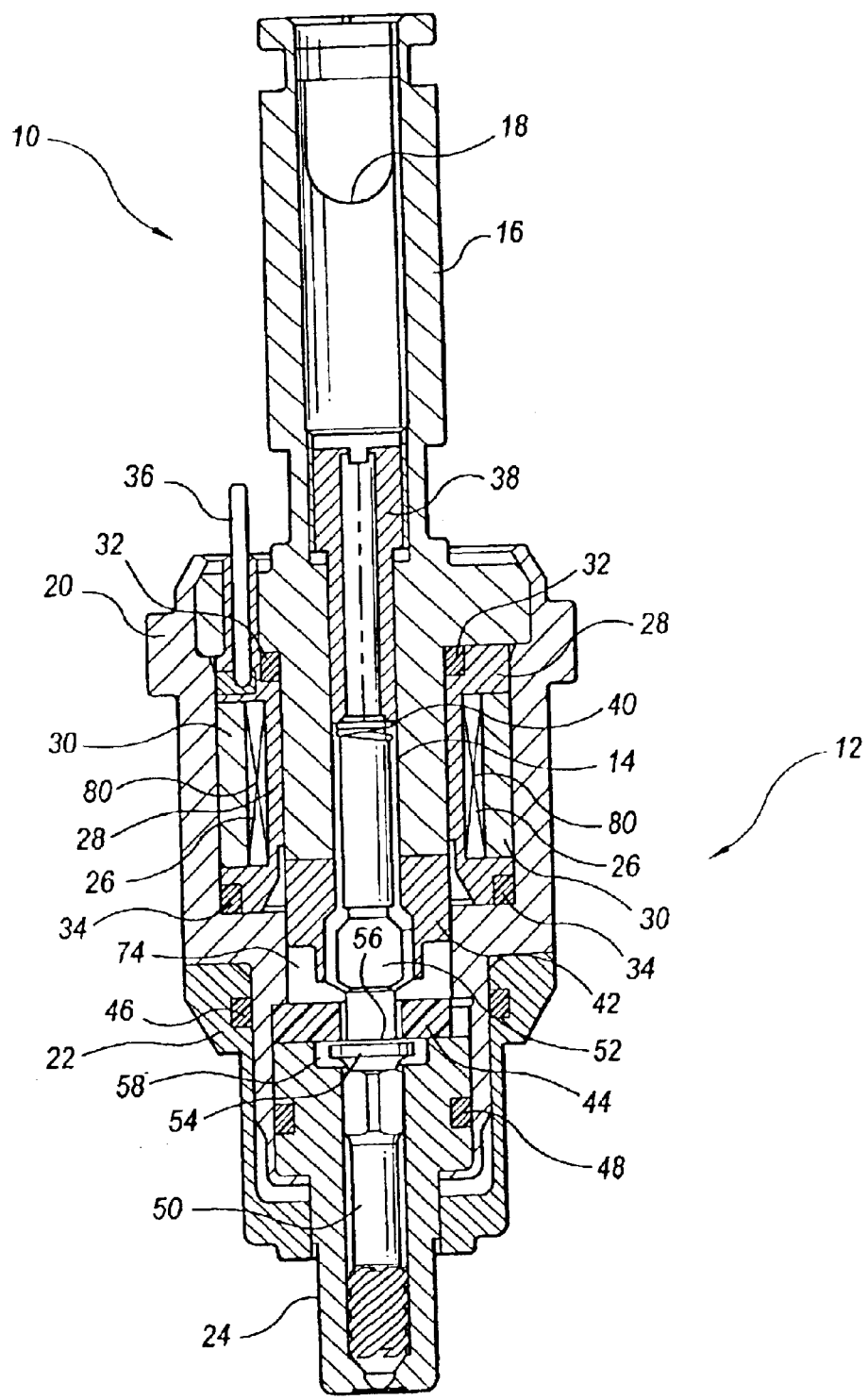
FIG. 5 is a cross section of a swirl injector for internal combustion engines according to the present invention.
Figure 6:
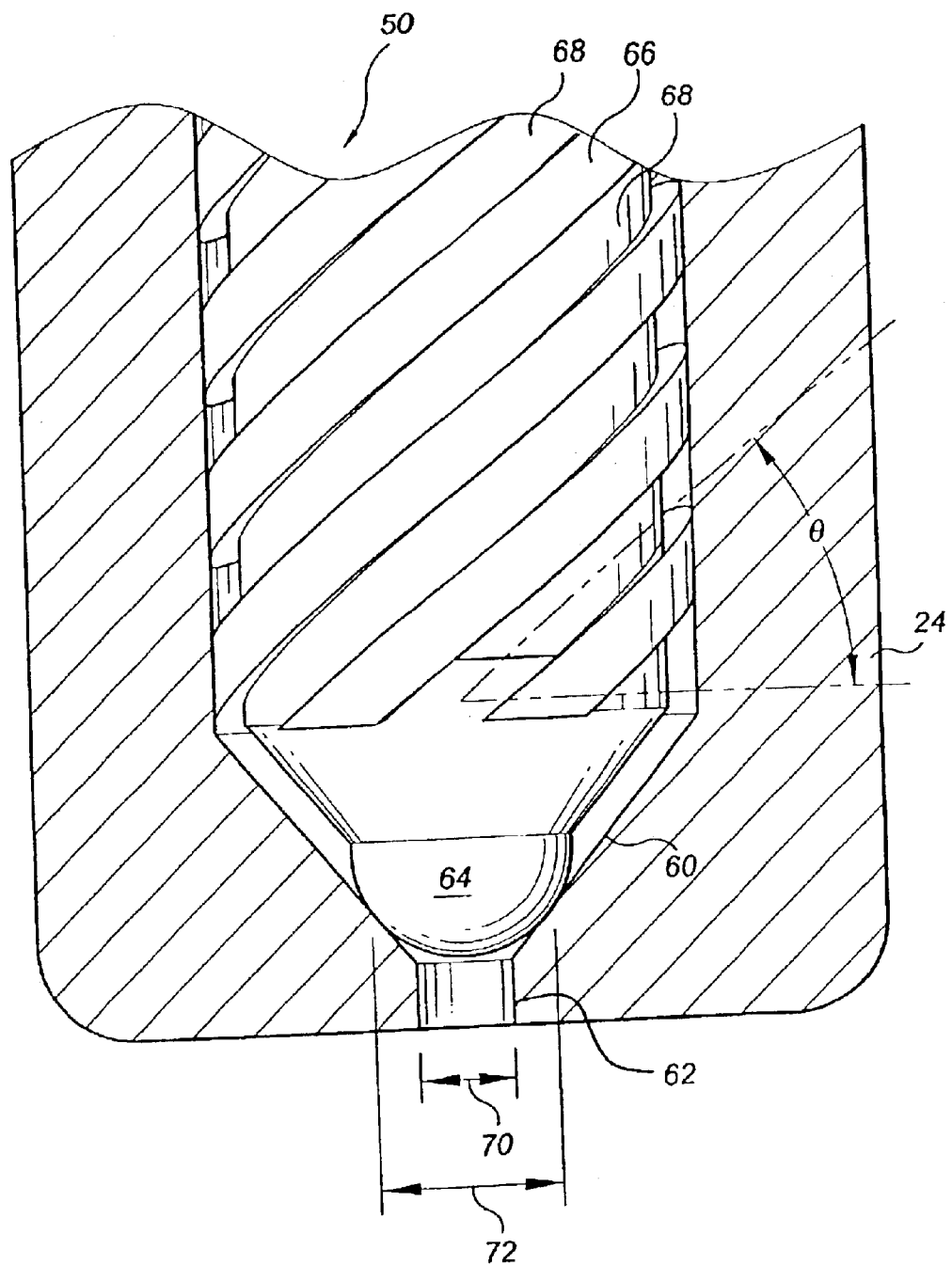
FIG. 6 is a detail section view showing the ball tip of the needle valve and the valve seat in a swirl injector according to the present invention.

The swirl injector of the present invention, designated generally as 10 in the drawings, is shown in FIGS. 5 and 6. The injector 10 has a housing 12 defining a fluid channel 14, a needle valve 50 disposed in the fluid channel 14 biasing the valve to a closed position, and a solenoid 80 disposed in the housing 12 encircling the fluid channel 14. The housing 12 includes several components assembled to form an elongated and generally cylindrical valve body. The housing 12 has a high pressure inlet plug 16 adapted for connection to an engine high-pressure fuel line using a plug-in inlet part of the injector with a cylinder-ball convex, fixing hole at the plug head. The diameter, height and wall thickness of the inlet plug 16 may be varied for any configuration of gasoline or diesel engine. The inlet plug 16 has a bore defined therein with a fuel filter 18 disposed in the upper part of the bore.

The housing 12 has a ground housing 20 encircling the middle portion of the inlet plug 16 and an installation housing 22 abutting a shoulder on the ground housing 20 and enclosing the lower portion of the ground housing 20. Elastic O-ring 46 maintains the installation housing 22 snugly mounted on the ground housing 20. A conical head nozzle 24 has an upper portion enclosed by the ground housing 20 and a lower portion extending through a bore in the installation housing 22. Elastic O-ring 48 maintains the nozzle 24 snugly mounted in the ground housing 20. The installation housing 22 is adapted for connecting the injector 10 to the fuel injection port in the cylinder head and prevents the nozzle 24 from contacting the metal surface of the cylinder.

The solenoid 80 includes a coil 26 wound on a ground ring housing 28 and covered by a polar ring housing 30. The solenoid 80 encircles the lower portion of the inlet plug 16 and the assembly is held together by elastic O-rings 32 and 34. A polar electrode 36 is electrically connected to the coil 26 and extends through the ground housing 20 for attachment to wiring from a triggering circuit for controlling the timing and pulse duration of the injector 10. The coil 26 is made from wire having a diameter and number of turns capable of handling current produced by full battery voltage, either 24V or 42V, to continuously vary the current to achieve a quick lift time without burning out the coil 26. The battery may be connected to the solenoid 80 by a relay switched by a voltage controlled by the engine control unit.

The housing 12 includes a blocking plug 38 disposed in the bore defined in the inlet plug 16 and a helical compression spring 40 disposed below the blocking plug 38. A nozzle head housing 42 abuts the lower end of the inlet plug 16 and is encircled by the lower end of the ground ring housing 28 and the ground housing 20. The nozzle head housing 42 defines a continuation of the fluid channel 14. A shock brake ring 44 is disposed between the nozzle head housing and the nozzle 24.

A needle valve 50 is disposed in the fluid channel 14 defined by the housing 12. The needle valve has a lower portion disposed in the nozzle 24 and a head 52 disposed in the needle head housing 42 and extending at least partly inside the solenoid 80, the upper end of the needle valve 50 compressing spring 40. An annular stop disk 54 is disposed about the needle valve 50 below the shock brake ring 44. A small lifting gap 56 of about 50 $\mu$m separates the disk 54 from the shock brake ring 44 when the needle valve 50 is biased in the closed position, permitting fuel to flow past the nozzle head 52 and through the shock brake ring 44 to fill a small reservoir 58 surrounding the disk 54 and around the lower end of the needle 50 up to the tip of the needle 50.

FIG. 6 shows a detail view of the tip of the needle valve 50 and the conical head nozzle 24. The nozzle 24 defines a conical valve seat 60 with a cylindrical discharge orifice 62 descending; from the apex of the cone to the bottom surface of the nozzle 24. The needle 50 has a ball shaped tip 64 which generally defines a circular section in the conical valve seat 60 when the injector valve is in the closed position. The lower portion of the needle 50 has a plurality of helical ridges 66 wound around its circumference which define a plurality of helical or spiral grooves 68. The spiral grooves 68 do not have a round or arcuate bottom; rather, the ridges 66 define grooves 68 which have a planar bottom wall and planar side walls. The grooves 68 preferably have a width-to-depth ratio of about 1.5:1. The grooves 68 preferably define an angle $\theta$ of 46° with respect to an axis extending transverse to the longitudinal axis of the needle 50. The ridges 66 closely abut the cylindrical bore defined in the nozzle 24 above the conical valve seat 60 so that fuel is forced to flow through the spiral grooves 68 to reach the discharge orifice 62. A preferred diameter of the cylindrical discharge orifice 62, indicated by the dimension line 70, is about 0.8 mm. A preferred, mean diameter of the circular section defined by contact of the ball tip 64 with the conical valve seat 24, indicated by the dimension line 72, is about 1.5 mm. A preferred diameter of the cylindrical bore defined in the nozzle 24 above the conical valve seat is about 4.0 mm.

In use, the needle valve 50 oscillates between an open position and a closed position under control of the solenoid 80 and the compression spring 40. When the solenoid 80 is energized, the needle valve 50 is attracted by the magnetic field of the coil 26, lifting until the disk 54 is stopped by the shock brake ring 44 and compressing spring 40. This action lifts the ball tip 64 off the valve seat 60, permitting fuel to flow directly into the combustion chamber. When current to the solenoid 80 switches off, the resilient force of the compression spring 40 moves the needle valve 50 downward, seating the ball tip 64 on the valve seat 60 to shut off the flow of fuel into the combustion chamber defined in the cylinder. Advantageously, the ball tip 64 provides a tight seal with the valve seat 60 and prevents post-injection fuel leakage into the cylinder that occurs with conical needle tips and which may cause soot in the exhaust emissions and particulate build-up in the discharge orifice, adversely affecting the spray pattern.

The lifting gap section defined by the shock brake ring 44 and the stop disk 54 subdivides the flow into two volumes, a flow upstream from the lifting gap 56 (Volume-1), and a fuel volume downstream from the lifting gap 56 (Volume-2).

The needle's 50 mass is preferably about 5 grams, and moves upstream under the influence of the magnetic field of the solenoid under a force $\Delta F=2$ kg-f (20N) with approximately constant acceleration $a=4 \cdot 10^3$ m/s. The value $\Delta F$ is the difference in the forces produced by the solenoid 80 and the compression spring 40. The lifting gap is about 50 $\mu$m and the lifting time is about 60 $\mu$s, which is much less than any other operational characteristic time, such as the viscous constant, injection time, etc. The ultra short, needle lifting time cannot affect any additional disturbances into the transient flow into the injector other than those produced under the forced pressure gradient, the injector configuration (boundary conditions) and injection timing dynamics (initial conditions).

A fuel, pressurized by a fuel pump at 5.0 to 7.0 MPa for gasoline direct injection engines or 60.0 to 100.0 MPa for diesel direct injection engines, flows through a high pressure fuel pipeline into the inlet plug 16, flows through the bore in the blocking plug 38 and the compression spring 40, around the needle valve head 34, and settles into a chamber 74 defined by the needle head housing 42 and the shock brake ring 44 when the needle valve 50 is raised to an open position. At the same time, a portion of fuel about 1.2 mm$^3$ deposited in Volume-2 is flowing out from the nozzle 24 due to the open space between the ball tip 64 and the valve seat 60. Due to the pressure differential of the high pressure in the injector 10 and the ambient pressure in the combustion chamber, the fuel flow initially accelerates straight downstream (an axial momentum transferred afterwards to the core jet D) in the cylindrical discharge orifice 62. Thereafter the flow is shaped by passage through the spiral grooves 68 in a screwing action that imparts a 3-dimensional swirling momentum to the flow, shown in FIG. 2.

Proper selection of the axial screwing period (length), the number of grooves 68, and the cross-sectional area of the grooves is dependent on the engine type. For example, in a gasoline engine injecting under a pressure of 7.0 MPa, the screwing period is 7.98 mm, the number of grooves is six, and the cross-sectional area of the grooves 68 is 0.23 mm$^2$. Under these conditions a very precise amount of fuel may be injected at a rate up to 15.0 mm$^3$/ms. For a diesel engine injecting under a pressure of 80.0 MPa, the screwing period is 5.67 mm, the number of grooves 68 is eight, and the cross-sectional area of the grooves 68 is 0.34 mm$^2$. Under these conditions, a very precise amount of fuel may be injected at a rate up to 35.0 mm$^3$/ms.

The flow goes to the nozzle 24 cut edge, oscillates, and breaks up into ligaments to droplets. However, due to the two different momentums, axial and swirling, from an early stage the ejected fuel spray develops as the superimposed structure of the umbrella-like spray Q and the core jet D, as shown in FIG. 1. Due to the high swirling speed generated (up to two thousand revolutions per second) and the Coriolis force resulting from rotation, the spray angle can be targeted on a pitch angle from 3° to 15° measured from the injector axial axis to the axis of the core jet.

This spray flow-refocusing feature of the injector 10 becomes very important to adapt the injector 10 for both injection modes, early and late. For a given injector configuration, the swirl speed is dependent only on the injection pressure, which is a controllable and variable value. In an early injection mode (during the intake stroke) there is a large spread space-in the combustion chamber defined in the cylinder and a relatively long time to form a fine fuel spray. Applying a lower injection pressure (5.0 MPa for a gasoline engine and 60.0 MPa for a diesel engine) the injector 10 will eject fuel at a pitch angle close to 3°, providing low penetration and swirl speeds. For late injection (during the compression stroke) there is a small spread space in the combustion chamber defined in the cylinder and a relatively short time to form a fine fuel spray. A higher injection pressure (maximal pressure level, 70 MPa for a gasoline engine and 90.0 MPa for a diesel engine) applied to the injector 10 will eject fuel at a pitch angle close to 15°, providing higher penetration and swirl speeds than in early injection mode. This permits adjusting injector operation to any engine cylinder with different piston sizes and shapes and controlling the amount of fuel injecting in either early or late injection mode.

When the solenoid 80 is de-energized, the needle valve 50 is forced downward by expansion of the compression spring 40 under a force F=15N in a period of 0.18 ms, seating the ball valve 64 on the valve seat 60 to block further injection. With this downward movement, the stop disk 54 is detached from the shock brake ring 44 and opens the lifting gap 56 to 50 $\mu$m, allowing a metered quantity of fuel to come into Volume-2 from Volume-1. The injector 10 has excellent performance characteristics in providing a rapid response to vary the injection period with engine speed in a few milliseconds, and a controllable injection duration down to an ultra-short level of about 0.25 ms. This permits operation in either an early or late injection mode.

The hardware components of the injector housing 12 and the needle valve are preferably made from stainless steel. The O-rings 32, 34, 46, and 48 require a special composition due to the extremely fast changes in pressure that deform and stretch all injector units. The elasticity of the O-rings plays an important role because the stretching volume can affect the volume of fuel deposited in Volume-1 and Volume-2, and therefore the properties of the ejected fuel stream. The O-rings must be able to operate in a wide range of stresses, up to 100 kg/cm$^2$ for gasoline engines and up to 400 kg/cm$^2$ for diesel engines, and the O-ring loading specific volume change should be limited to 10% of the full unstretched O-ring volume. It was found that a material meeting these requirements is a fabricated composition of mineral rubber with specifically selected chemicals working as a dispersing agent, a tackier, and a reinforcement agent. Hard clay may be used as the tackier, a combination of EPC black and FT black as the dispersing agent, and a combination of $MgCO_3$, $ZnO$, $BaSO_4$ and $CaCO_3$ as the reinforcing agent.

Although the swirl injector 10 provides improved performance over present fuel injectors using existing electronic engine controls, the performance of the swirl injector 10 may be enhanced, particularly for diesel engines, by using the swirl injector 10 in combination with a novel on-board flow meter sensor capable of measuring instantaneous volumetric flow rates and pressure gradients. The flow meter sensor is described more particularly in my co-pending U.S. patent application titled FLOW METER, filed concurrently with the present application.

Figure 7:
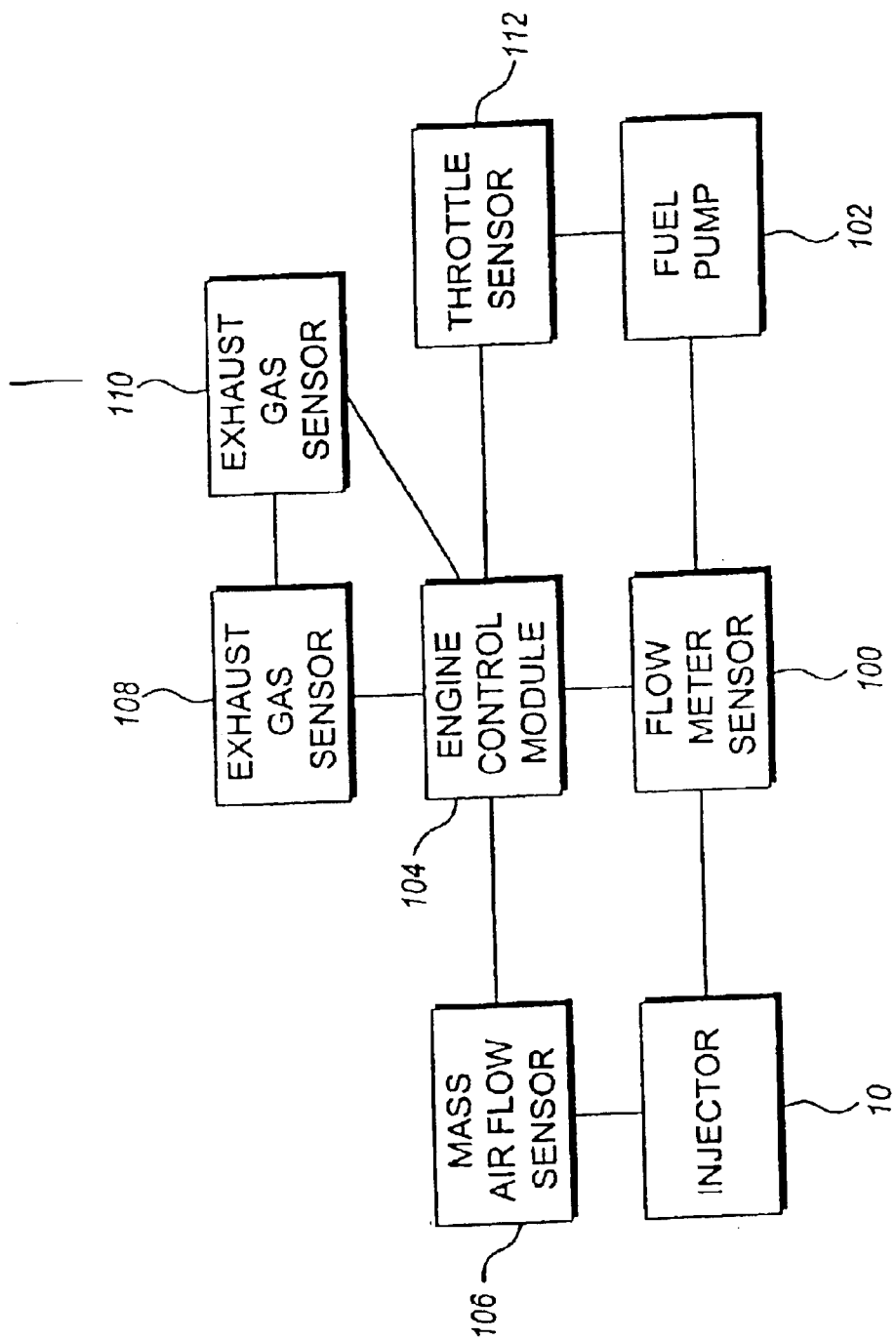
FIG. 7 is a block diagram showing a flow meter sensor in-line with a swirl injector according to the present invention.

As shown in FIG. 7, the flow meter sensor 100 is connected in the fuel pipeline between the fuel pump 102 (or the fuel tank depending on the engine configuration) and the injector 10. The flow meter 100 provides signals for measuring the instantaneous center line velocity in the fuel line to an interface board on the engine control module 104, which uses software implementing a precise solution to the Navier-Stokes equations for a periodically oscillating transient flow in a pipe to provide instantaneous volumetric flow rates and pressure gradients to the engine control module 104. The engine control module 104 also receives input from a variety of other sensors, including, but not limited to, a mass air flow sensor 106, an exhaust gas recirculation sensor 108, a speed sensor 110, and a throttle position sensor 112. The engine control module 104 may be programmed to adjust the injection mode (early or late), timing, duration, and pressure in response to load conditions and emissions standards in order to adjust the volumetric flow rate and spray pattern for maximum fuel economy, power, and emissions compliance.

Figure 8:
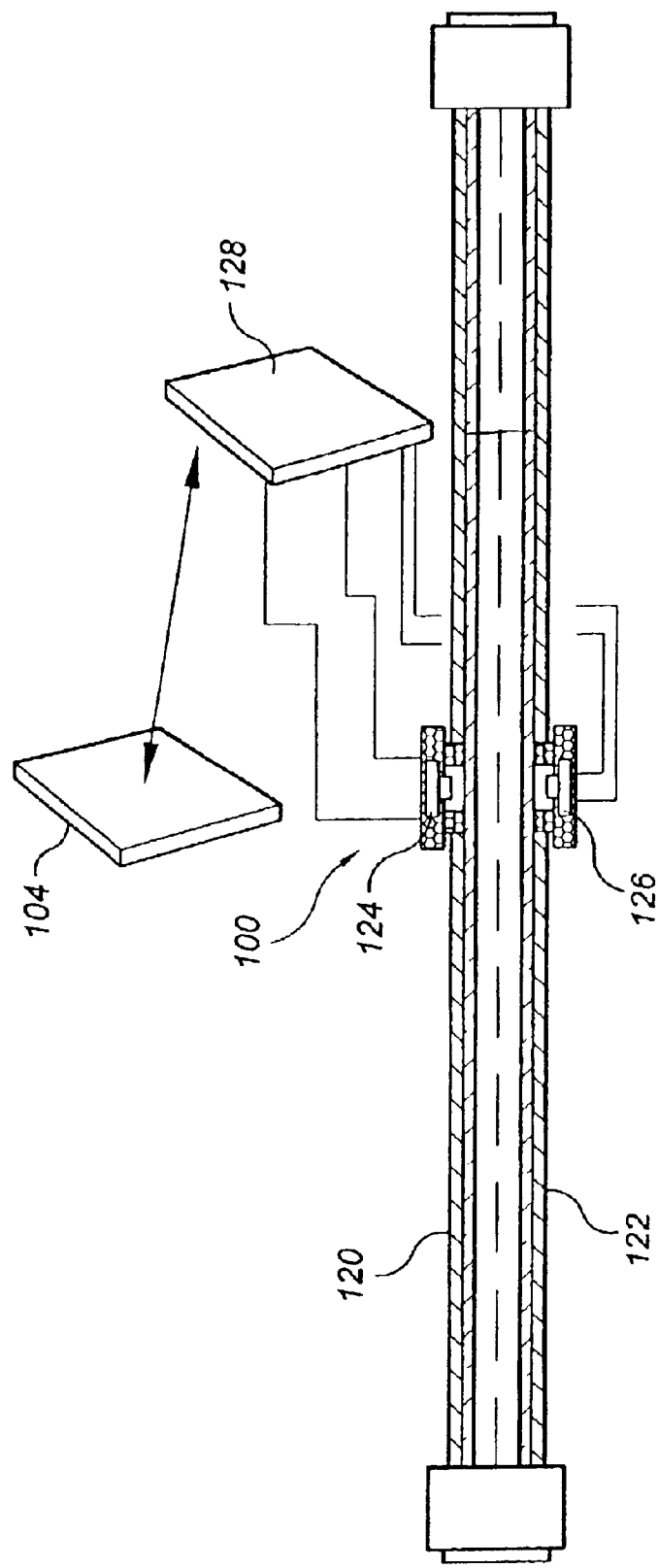
FIG. 8 is a section view of an on-board flow meter for use in combination with the swirl injector of the present invention.

As shown diagrammatically in FIG. 8, the on-board flow meter sensor 100 constitutes a section of pipe which is inserted in the fuel pipeline. The flow meter 100 has a steel jacket 120 enclosing a quartz capillary tube 122 which is open at both ends for connection to the fuel pipeline. The quartz tube 122 has an inside diameter which preferably measures between 2.5 and 3.5 mm. A laser Doppler anemometer is mounted on the quartz tube 122 through an, opening in the steel jacket 120. The optical components of the, anemometer comprise a laser diode 124 light source emitting a laser at 832 nm and 18 mW which is simultaneously split into a number of beams (symmetrically spread as zero-, first-, second-, etc. orders), including two symmetrical first order beams which are collimated using an optic fiber of 10 $\mu$m precisely adjusted on the, laser diode stripe normally to the main axis of the elliptical cone, a mask for blocking all beams except the two first order beams and for focusing the two first order beams to intersect in the centerline of fuel flow in the quartz tube 122, and a pin diode 126 with an optic fiber collimator to receive the scattered light from the control measurement zone defined by the intersection of the two beams in the center line of the quartz tube 122.

Current produced in the pin diode 126 is fed to an interface board 128 for calculating the instantaneous center line velocity of fuel flow, and the data from the interface board 128 is fed to the engine control module 104 for calculating volumetric flow rates with the module's microprocessor. Preferably the interface board 128 is built into the engine control module 104. The engine control module 104 must be capable of 1,000 operations per second for running sensor operation and optimal combustion setup.

Operation of the swirl injector 10 with the on-board sensor 100 results in an increase in fuel economy of 14–22%, power increase, and reduced exhaust emissions, especially with respect to diesel engines, due to online optimized combination of injection pressure, fuel spray quality, and precision timing of injection and ignition.

It is to be understood that the present invention is not limited to the embodiments described above, but encompasses any and all embodiments within the scope of the following claims.

I claim:
1. A swirl injector for a direct injection internal combustion engine, which swirl injector is controlled by a triggering circuit, comprising:
   (a) a valve body having a fluid passage defined therethrough, the valve body having a fluid inlet at a first end and a nozzle defining a conical valve seat at a second end, which nozzle is for discharging fuel, the nozzle further defining a discharge orifice in fluid communication with the conical valve seat, the valve body further having a shock brake ring disposed in the fluid passage and defining an upper valve body portion and a lower valve body portion;
   (b) a solenoid disposed in the valve body, the solenoid having a coil and an electrode electrically connected to the coil, the electrode being adapted for connection to the triggering circuit for energizing the solenoid;
   (c) a needle valve having a head at a first end and a tip at a second end, the needle valve having a disk about its circumference, the needle valve being disposed in the fluid passage with the disk disposed in the lower valve body portion and the head extending at least partially inside the coil of the solenoid, the needle valve having a plurality of spiral grooves adjacent the tip; and
   (d) a compression spring disposed in the upper valve body portion;
   (e) wherein the compression spring biases die needle valve to a closed position in which the needle valve tip is seated against the conical valve seat defined in the nozzle and wherein the solenoid moves the needle valve to an open position in which the needle valve tip is moved from the conical valve seat in order to discharge fuel from the nozzle.

2. The swirl injector of claim 1, wherein the valve body is defined by an elongated housing.

3. The swirl injector of claim 1, wherein the fluid passage is defined axially through the valve body.

4. The swirl injector of claim 1, wherein the fluid inlet comprises a plug adapted for attachment to a pressurized fuel line.

5. The swirl injector of claim 1, wherein the discharge orifice is a single cylindrical orifice.

6. The swirl injector of claim 5, wherein the single cylindrical orifice is in fluid communication with an apex of the conical valve seat.

7. The swirl injector of claim 1, wherein the shock brake ring is disposed transversely in the fluid passage.

8. The swirl injector of claim 1, wherein the solenoid is disposed in the upper valve body portion.

9. The swirl injector of claim 1, wherein the coil encircles the fluid passage.

10. The swirl injector of claim 2, wherein the electrode extends through the housing.

11. The swirl injector of claim 1, wherein the triggering circuit energizes the solenoid for precise timing durations at precisely timed intervals.

12. The swirl injector of claim 1, wherein the needle valve has a needle head at the first end.

13. The swirl injector of claim 1, wherein the spiral grooves are defined by helical ridges.

14. The swirl injector of claim 1, wherein the swirl injector ejects a fuel spray having an umbrella spray superimposed on a core jet.

15. The swirl injector of claim 14, wherein the swirl injector ejects a fuel spray having an umbrella spray superimposed on a core jet at a penetration speed, swirl speed, and pitch angle controllable by varying injection pressure.

16. The swirl injector of claim 15, wherein the swirl injector ejects a fuel spray having an umbrella spray superimposed on a core jet at a penetration speed, swirl speed, and pitch angle controllable by varying injection pressure for operation in a dual switch mode between early injection and late injection.

17. The swirl injector of claim 1, wherein each spiral groove is defined by a planar bottom wall and a pair of opposed, planar side walls.

18. The swirl injector of claim 17, wherein each spiral groove has a width-to-depth ratio of about 1.5 to 1.

19. The swirl injector of claim 1, wherein each spiral groove defines an angle of about forty-six degrees with respect to an axis transverse to a longitudinal axis of the needle valve.

20. The swirl injector of claim 1, wherein the disk of the needle valve and the shock brake ring define a lifting gap when the needle valve is in the closed position, the lifting gap measuring about 50 $\mu$m.

21. The swirl injector of claim 20, wherein the solenoid is capable of developing an electromagnetic field of sufficient strength to move the needle valve to a position in which the disk is seated against the shock brake ring in about 60 $\mu$s.

22. The swirl injector of claim 1, wherein the coil of the solenoid has a wire diameter and number of turns capable of operating from current produced by substantially full battery voltage associated with the engine in order to move the needle valve from the closed position to the open position in about 60 $\mu$s.

23. The swirl injector of claim 1, wherein the plurality of spiral grooves comprises six grooves, each groove having a length of about 7.98 mm and a cross-sectional area of about 0.23 mm$^2$, the swirl injector being adapted for use in a gasoline engine injecting at a pressure of about 7.0 MPa.

24. The swirl injector of claim 1, wherein the plurality of spiral grooves comprises eight grooves, each groove having a length of about 5.67 mm and a cross-sectional area of about 0.34 mm$^2$, the swirl injector being adapted for use in a diesel engine injecting at a pressure of about 80.0 MPa.

25. The swirl injector of claim 1, wherein the tip of the needle valve is a rounded ball tip.

26. The swirl injector of claim 16, wherein the nozzle ejects fuel at a pitch angle of about 3° measured between the core jet and a longitudinal axis of the nozzle at low injection pressure and at a pitch angle of about 15° measured between the core jet and a longitudinal axis of the nozzle at high injection pressure.

27. The swirl injector of claim 1, in combination with a flow meter sensor connected in a vehicle high pressure fuel line, the flow meter sensor comprising:
   (a) a quartz glass measurement tube;
   (b) a laser diode generating a pair of collimated laser beams focused to intersect substantially at a center line of the quartz tube;
   (c) a PIN diode focused to receive light scattered from substantially the center line of the quartz tube; and
   (d) an interface board electrically connected to the PIN diode for computing an instantaneous velocity of fuel flowing in the quartz tube at substantially the center line of the quartz tube.

28. The combination of claim 27, wherein the triggering circuit comprises an engine control module connected to the interface board, which engine control module has a microprocessor programmed to compute at least one of an instantaneous pressure gradient and a volumetric flow rate.

29. The combination of claim 28, wherein the engine control module precisely regulates timing, pulse duration, and pressure of injection in the swirl injector to adjust the volumetric flow rate to engine load.

* * * * *